United States Patent
Verbo et al.

[19]

[11] Patent Number: 6,065,290
[45] Date of Patent: May 23, 2000

[54] COMPACT BRAKE-CONTROL DEVICE

[75] Inventors: Ulysse Verbo, Aulnay-Sous-Bois; Cedric Leboisne, La Courneuve, both of France

[73] Assignee: Bosch Systems de Freinage, Draney, France

[21] Appl. No.: 08/913,458

[22] PCT Filed: Aug. 27, 1997

[86] PCT No.: PCT/FR97/01528

§ 371 Date: Sep. 4, 1998

§ 102(e) Date: Sep. 4, 1998

[87] PCT Pub. No.: WO98/21078

PCT Pub. Date: May 22, 1998

[30]         Foreign Application Priority Data

Aug. 11, 1996  [FR]  France ................................ 96 13615

[51] Int. Cl.[7] .............................. B60T 13/00; F01B 29/00
[52] U.S. Cl. ............................ 60/547.1; 60/533; 92/161
[58] Field of Search ..................... 60/533, 545, 547.1; 92/161

[56]              References Cited

U.S. PATENT DOCUMENTS 2,799,248  7/1957  Scheel ................................ 60/547.1 X
4,790,235  12/1988  Gautier et al. ...................... 92/161 X
4,798,129  1/1989  Staub, Jr. ............................ 92/161 X
5,072,996  12/1991  Heibel et al. ....................... 60/547.1 X
5,607,207  3/1997  Nagashima et al. .................. 60/545 X
5,666,811  9/1997  Elliott ................................ 92/161 X
5,685,150  11/1997  Hinz et al. .......................... 60/547.1
5,685,160  11/1997  Hinz et al. .......................... 92/161 X

FOREIGN PATENT DOCUMENTS 56-120444  9/1981  Japan .................................. 60/547.1

*Primary Examiner*—John E. Ryznic
*Attorney, Agent, or Firm*—Leo H McCormick, Jr; Warren Comstock

[57]                ABSTRACT

A brake-control device having a vacuum booster (1), a master cylinder (2) and an electro-hydraulic module (3) for controlling brake pressure. The booster (1) has a front shell (10) and a rear shell (11) having a cylindro-frustroconcal shape with first (R10) and second (R11) outsider radii. The master cylinder (2) and module (3) being secured to the front shell (10) at least three fixing points (71, 72, 73). The fixing points defining a peripheral ring (100) on the front shell which is delimited by an inside radius (Ri) that is equal to half of the outside radius (R10) of the front shell (10).

6 Claims, 5 Drawing Sheets

COMPACT BRAKE-CONTROL DEVICE

The present invention relates to a brake-control device comprising a vacuum-type booster, a master cylinder and an electro-hydraulic module for controlling the braking pressure, in which device the booster has a front shell and a rear shell of cylindro-frustoconical shape and of given respective outside radii and in which the master cylinder and the module are secured to the front shell.

BACKGROUND OF THE INVENTION

In a device of this type, at least known to those skilled in the art through public use, the electro-hydraulic module is mounted on a mounting plate itself carried by the mechanical connection which joins the master cylinder to the front shell of the booster.

However, bearing in mind the weight of the module, such a solution requires a modification to the thickness of the front shell, the arrangement and dimensions of the mechanical connection between the booster and the master cylinder, and therefore also the booster and the master cylinder at this mechanical connection.

SUMMARY OF THE INVENTION

The invention falls within this context and its object is to propose a brake-control device which, although composed of the same components and having the same compactness, can be produced from standard components without increasing the amount of material in, or making major modifications to, the components.

To this end, the brake-control device according to the invention is essentially characterized in that the module is secured to the front shell at least at three fixing points which belong to a peripheral ring of the front shell, delimited by an inside radius at least equal to half the outside radius of the front shell.

In practice, it is preferable to secure the module to the front shell by means of at least two straps.

The module can be held in place even better by giving the peripheral ring an inside radius substantially equal to the outside radius of the front shell.

In this case, the fixing points preferably belong to hooping encircling the front shell, it being possible for this hooping to be crimped, with the front shell, to the rear shell.

Further characteristics and advantages of the invention will emerge clearly from the description thereof which is given hereafter by way of non-limiting indication with reference to the drawings.

DETAILED DESCRIPTION OF THE INVENTION

Figure 1:
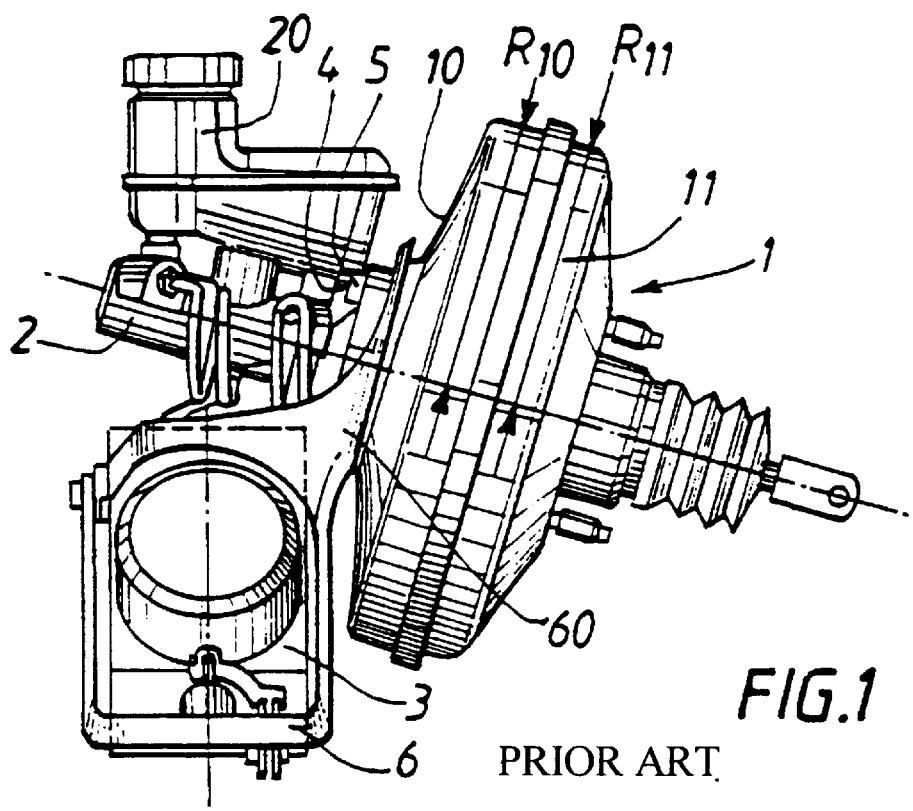
FIG. 1 is a side view of a brake-control device which is known through prior public use.
Figure 2:
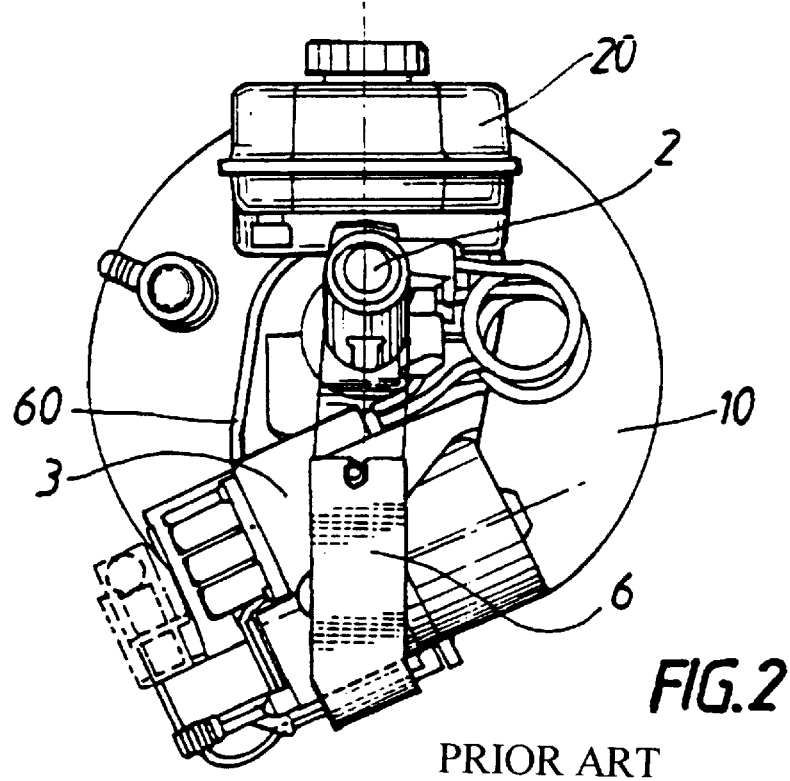
FIG. 2 is a front-on view of the device of FIG. 1.
Figure 3:
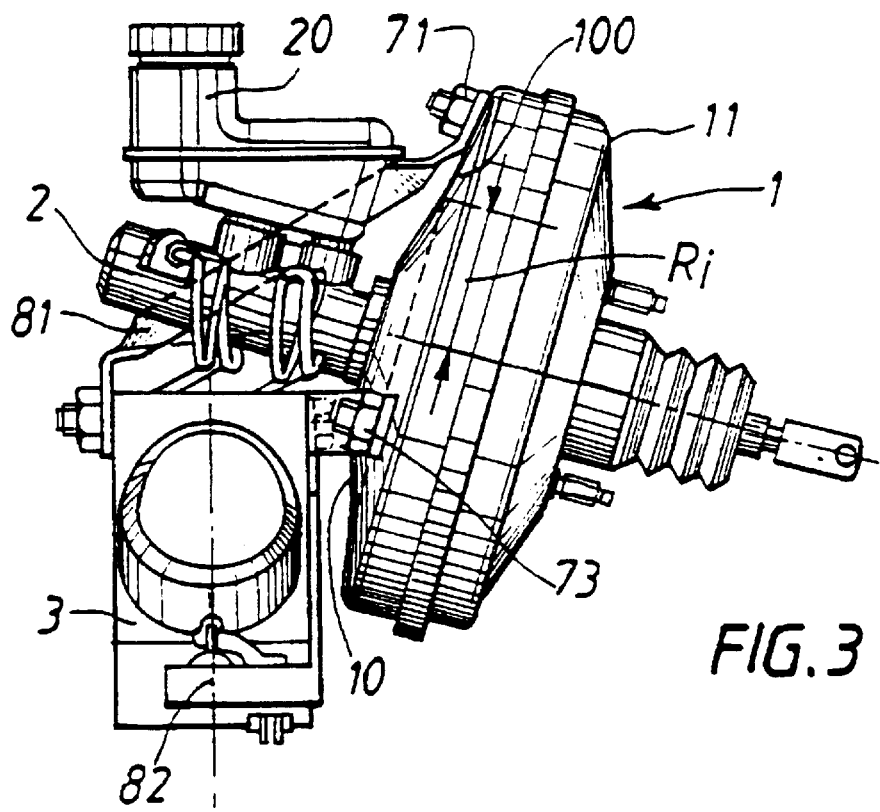
FIG. 3 is a side view of a brake-control device in accordance with a first embodiment of the invention.
Figure 4:
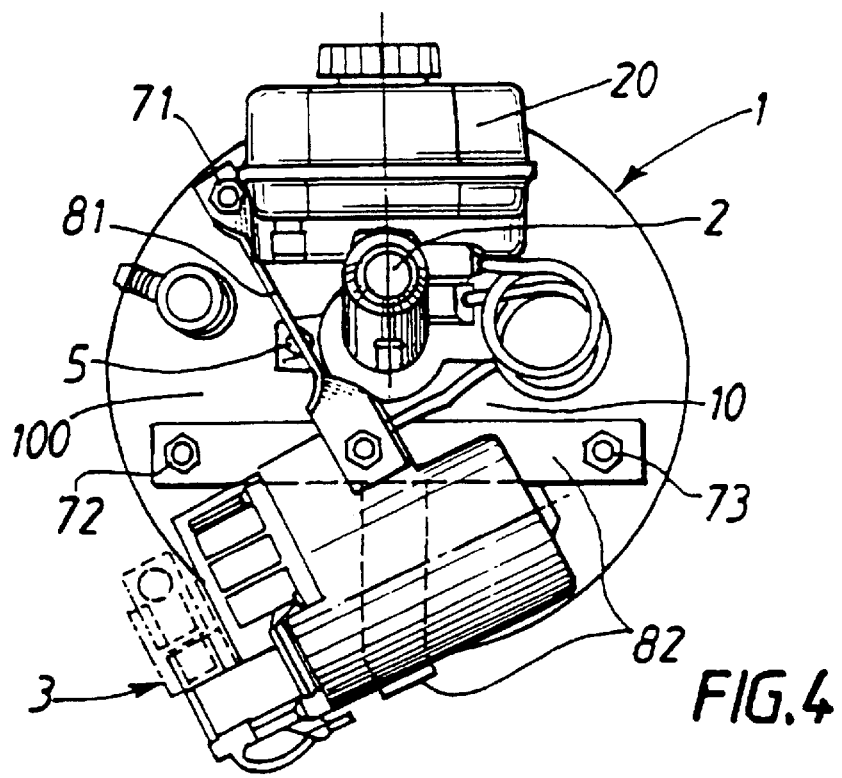
FIG. 4 is a front-on view of the device of FIG. 3.
Figure 5:
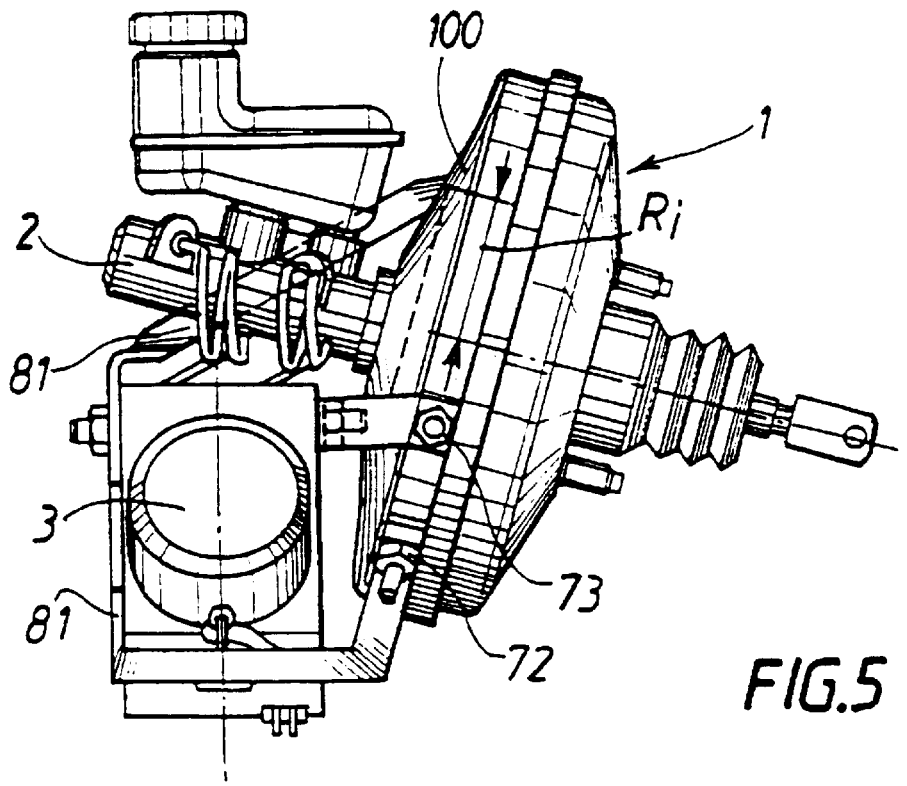
FIG. 5 is a side view of a brake-control device in accordance with a second embodiment of the invention.
Figure 6:
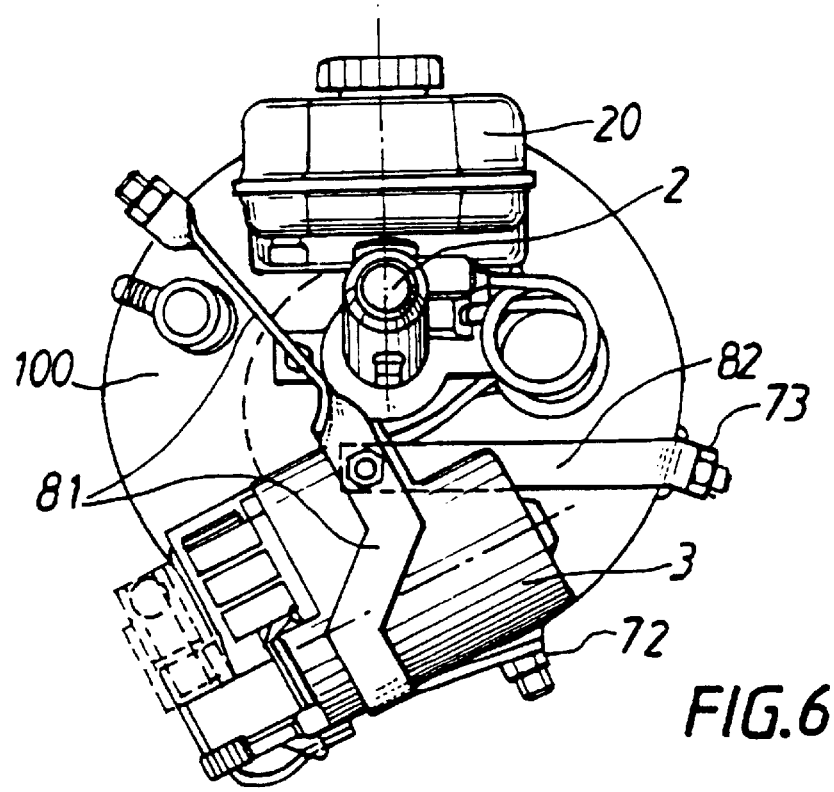
FIG. 6 is a front-on view of the device of FIG. 5.
Figure 7:
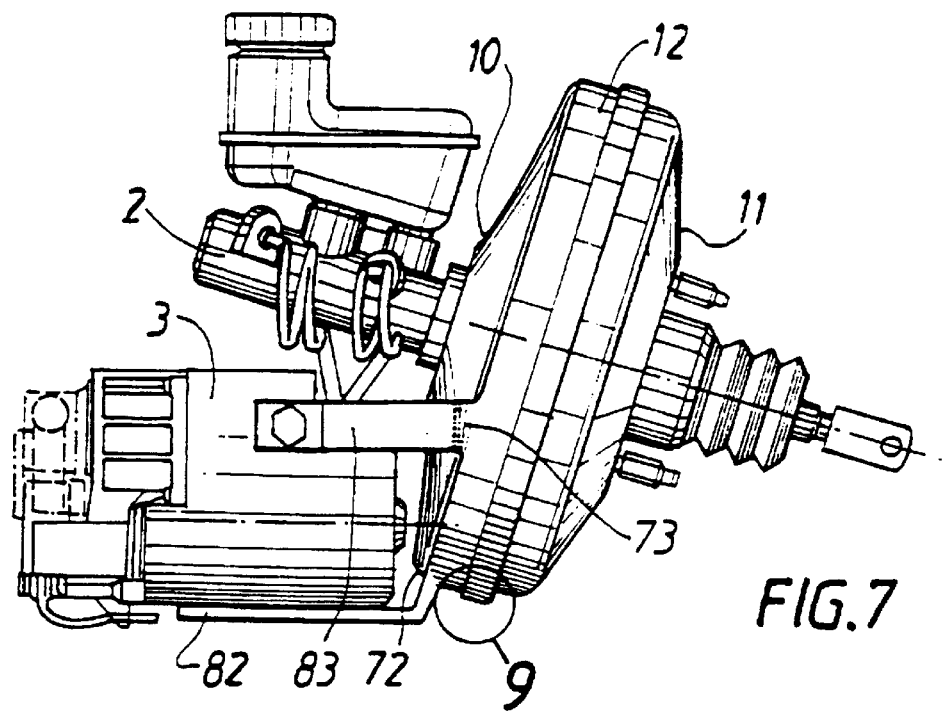
FIG. 7 is a side view of a brake-control device in accordance with a third embodiment of the invention.

The invention applies to a brake-control device of a type known per se (FIGS. 1 and 2) comprising a vacuum booster 1, a master cylinder 2, provided with a reservoir 20, and an electro-hydraulic module 3 allowing the braking pressure which normally comes from the master cylinder 2 to be controlled, for example in order to prevent the wheels from locking and/or spinning.

The booster traditionally includes a front shell 10 and a rear shell 11, these shells both having a cylindro-frustoconical shape and having very similar respective outside radii R10 and R11, the master cylinder 2 being secured to the front shell 10 by means of nuts 5 and bolts 4.

In the known device, the module 3 is carried by a mounting plate 6, an extension 60 of which is trapped between the booster 1 and the master cylinder 2 by means of the nuts and bolts such as 5 and 4 used to secure the master cylinder to the booster.

According to the invention, by contrast (FIGS. 3 to 11), the module 3 is secured to the front shell 10 at least at three fixing points such as 71, 72, 73 which belong to a peripheral ring 100 of the front shell 10, delimited by an inside radius Ri at least equal to half the outside radius R10 of the front shell.

Rather than use a solid support, it is therefore possible and preferable to secure the module 3 to the front shell 10 by means of several straps such as 81, 82 and 83.

As shown in FIGS. 5 to 11, the module 3 can be held in an optimum way by giving the peripheral ring 100 an inside radius Ri substantially equal to the outside radius R10 of the front shell 10, the fixing points such as 71, 72 and 73 then lying at the extreme periphery of the front shell 10.

In the preferred embodiments of the invention which are illustrated in FIGS. 7 to 11, the fixing points such as 71, 72 and 73 belong to hooping 12 encircling the front shell 10.

Figure 9:
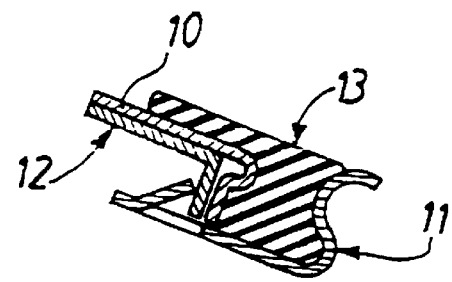
FIG. 9 is an enlarged sectional view of region 9 of the device of FIG. 7.
Figure 8:
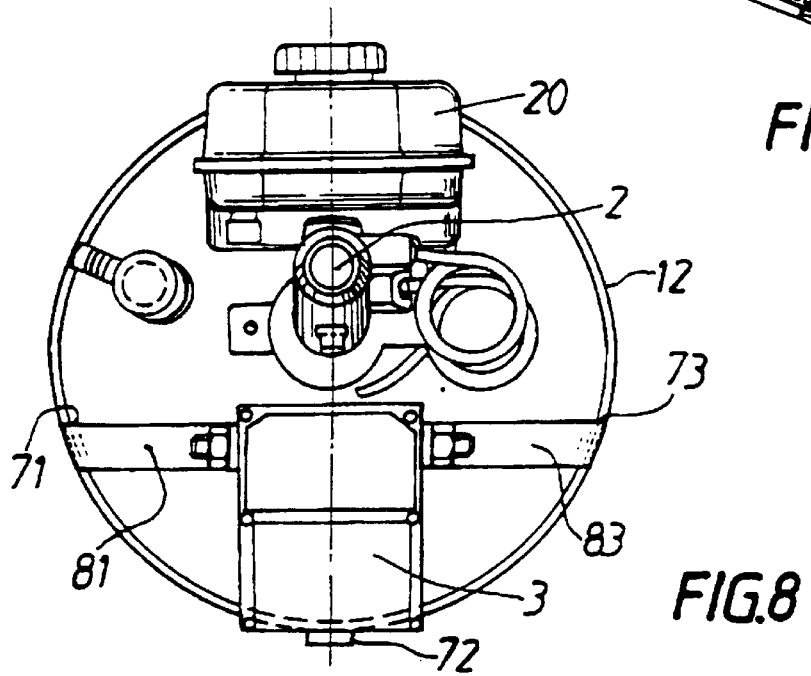
FIG. 8 is a front-on view of the device of FIG. 7.
Figure 10:
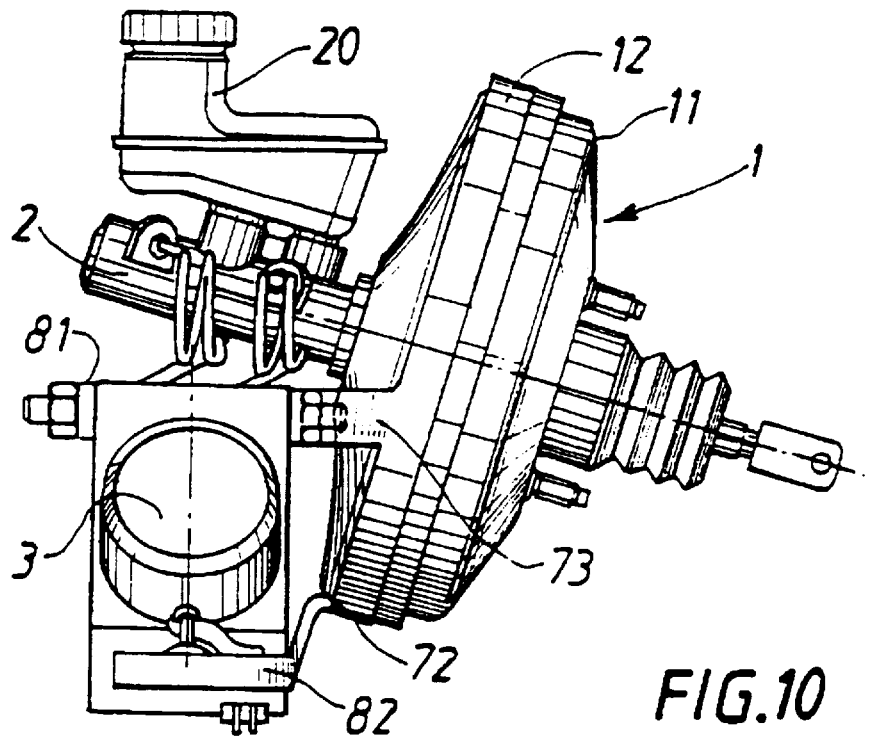
FIG. 10 is a side view of a brake-control device in accordance with a fourth embodiment of the invention.
Figure 11:
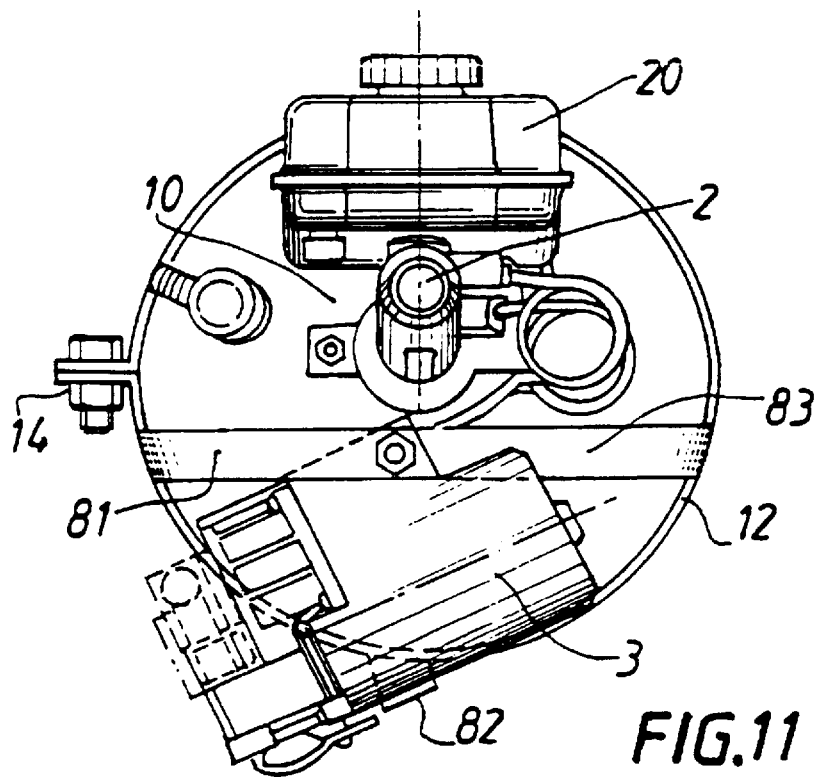
FIG. 11 is a front-on view of the device of FIG. 10.

In this case it is possible, as shown in FIG. 9, to crimp the hooping, with the front shell 10, to the rear shell 11, the crimping-together of the two shells also, in a well known way, trapping the elastic diaphragm 13 of the booster. It is, however, also possible, as shown in FIGS. 10 and 11, to provide open hooping, the parameter of which can be reduced by means of a bolt 14 until this hooping can hold itself on the front shell by elastic compression thereof.

We claim:

1. A brake-control device comprising a vacuum booster, a master cylinder and an electro-hydraulic module for controlling the braking pressure, said booster having a front shell and a rear shell of cylindro-frustoconical shape with corresponding first and second outside radii, said master cylinder and said module being secured to said front shell, characterized in that said module is secured to the front shell at least at three fixing points on a peripheral ring of said front shell, said peripheral ring being delimited by an inside radius which is at least equal to half of said outside radius of said front shell, said module is secured to said front shell by means of at least two straps.

2. The brake-control device according to claim 1, characterized in that said peripheral ring has an inside radius substantially equal to said outside radius of said front shell.

3. The brake-control device according to claim 2, characterized in that said fixing points belong to hooping ring which encircles said front shell.

4. The brake-control device according to claim 3, characterized in that said hooping ring is crimped, with said front shell, to said rear shell.

5. The brake-control device according to claim 1, characterized in that said fixing points belong to hooping ring which encircles said front shell.

6. The brake-control device according to claim 5, characterized in that said hooping ring is crimped, with said front shell, to said rear shell.

* * * * *